US006762759B1

(12) United States Patent
Lake et al.

(10) Patent No.: US 6,762,759 B1
(45) Date of Patent: Jul. 13, 2004

(54) RENDERING A TWO-DIMENSIONAL IMAGE

(75) Inventors: Adam T. Lake, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/454,504

(22) Filed: Dec. 6, 1999

(51) Int. Cl.[7] .............................................. G06T 15/50
(52) U.S. Cl. ....................... 345/426; 345/419; 345/629
(58) Field of Search ................................ 345/419, 420, 345/421, 422, 426, 428, 581, 424, 589, 619, 611, 629

(56) References Cited

U.S. PATENT DOCUMENTS

| | | | |
|---|---|---|---|
| 4,600,919 A | | 7/1986 | Stern |
| 5,124,914 A | | 6/1992 | Grangeat |
| 5,163,126 A | | 11/1992 | Einkauf et al. |
| 5,731,819 A | | 3/1998 | Gagne et al. |
| 6,057,859 A | | 5/2000 | Handelman et al. |
| 6,208,347 B1 | | 3/2001 | Migdal et al. |
| 6,337,880 B1 | | 1/2002 | Cornog et al. |
| 6,388,670 B2 | | 5/2002 | Naka et al. |

OTHER PUBLICATIONS

Lansdown et al ("Expression Rendering: A Review of Non-photorealistic Techniques": 1995 IEEE).*
Raskar et al ("Image Precision Silhouette Edsges": ACM, Apr. 1999, 1–58113–082–1/99/04).*
Ma et al ("Extracting Feature Lines from 3D Unstructured Grids": IEEE 1997: 0–8186–8262–0/97).*
Weinmann et al (Photoshop for Windows & Macintosh: chapter 17): 1998.*
Weinmann et al (Photoshop for Windows & Macintosh: chapter 7, and 13–15): 1998.*
Markosian et al., "Real–Time Nonphotorealistic Rending," Computer Graphics Proceedings, Annual Conference Series, SIGGRAPH, 1997, pp 415–420.
Gooch et al., "A Non–Photorealistic Lighting Model for Automatic Technical Illustration," Computer Graphics Proceedings, Annual Conference Series, SIGGRAPH, 1998, pp 447–452.
Lewis "Pose Space Deformation: A Unified Approach to Shape Interpolation and Skeleton–Driven Deformation" Centropolis, New Orleans, LA, 165–172.
Lasseter "Principles of Traditional Animation Applied to 3D Computer Animation" Pixar, San Rafael, California, 1987.
Thomas (Contributor)et al., "The Illusion of Life: Disney Animation" 47–51.
Hoppe, "Progressive Meshes" Microsoft Research, 99–108, http://www.research.microsft.com/research/graphics/hoppe/.
Popovic et al., "Progressive Simplicial Complexes" Microsoft Research http://www.research.microsft.com/~hoppe/.
Hoppe "Efficient Implementation of progressive meshes" Coput. & Graphics vol. 22, No. 1, pp. 27–36, 1998.

(List continued on next page.)

*Primary Examiner*—Mark Zimmerman
*Assistant Examiner*—Scott Wallace
(74) *Attorney, Agent, or Firm*—Fish & Richardson P.C.

(57) ABSTRACT

A two-dimensional image is rendered from data for a three-dimensional model. This is done by rendering a shaded image based on the data and rendering an outline image, such as a wireframe image or a silhouette image, based on the data. The outline image is rendered with the shaded image to obtain the two-dimensional image.

30 Claims, 8 Drawing Sheets

OTHER PUBLICATIONS

Taubin et al., "Progressive Forest Spilt Compression" IBM T.J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195–202.

Chow "Optimized Geometry Compression for Real–time Rendering" Massachusetts Institute of Technology, Proceedings Visualization 1997, Oct. 19–24, 1997, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

* cited by examiner

RENDERING A TWO-DIMENSIONAL IMAGE

BACKGROUND OF THE INVENTION

This invention is directed to rendering a two-dimensional ("2D") image from data for a three-dimensional ("3D") model.

Techniques for rendering a 2D image from a 3D model often focus on achieving a photorealistic (or "true-to-life") effect. A Gouraud-shaded image is an example of the type of image produced using photorealistic rendering. Nonphotorealistic ("NPR") rendering, on the other hand, can produce a 2D image having a sketchy or cartoon-like feel that is similar to hand-drawn images.

SUMMARY OF THE INVENTION

In general, in one aspect, the invention features a way of rendering a 2D image from data for a 3D model. According to the invention, a shaded image and an outline image, such as a wireframe or silhouette image, are rendered based on the data. The outline image is rendered with the shaded image to obtain the two-dimensional image.

Among the advantages of the invention may be one or more of the following. Rendering a 2D image from an outline image and a shaded image produces an NPR effect that can be varied by changing one of the images. The rendering process can be implemented on a computer. As a result, multiple NPR 2D images can be produced from a single 3D model merely by repositioning the 3D model and rendering a new 2D image for the model's new position. This reduces the amount of time and effort expended during the NPR rendering process.

Other features and advantages will become apparent from the following description, claims and drawings.

DESCRIPTION

Figure 1:
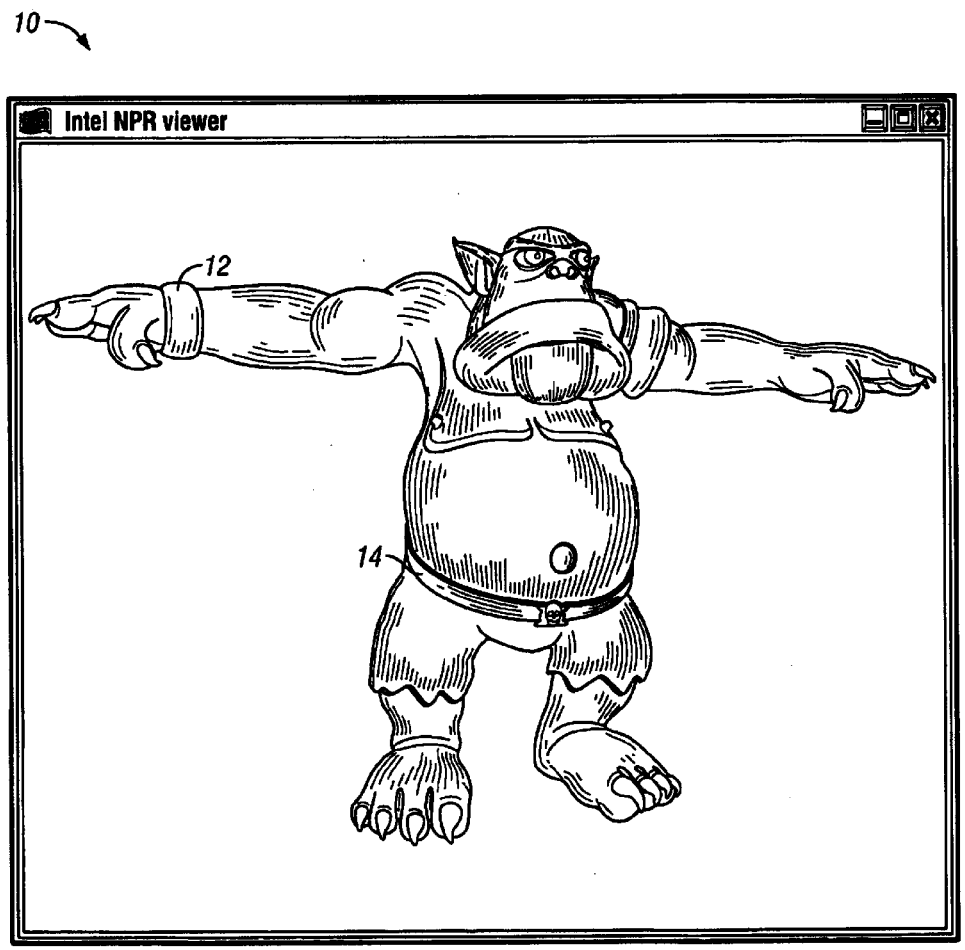
FIG. 1 is a view of a 3D model.
Figure 2:
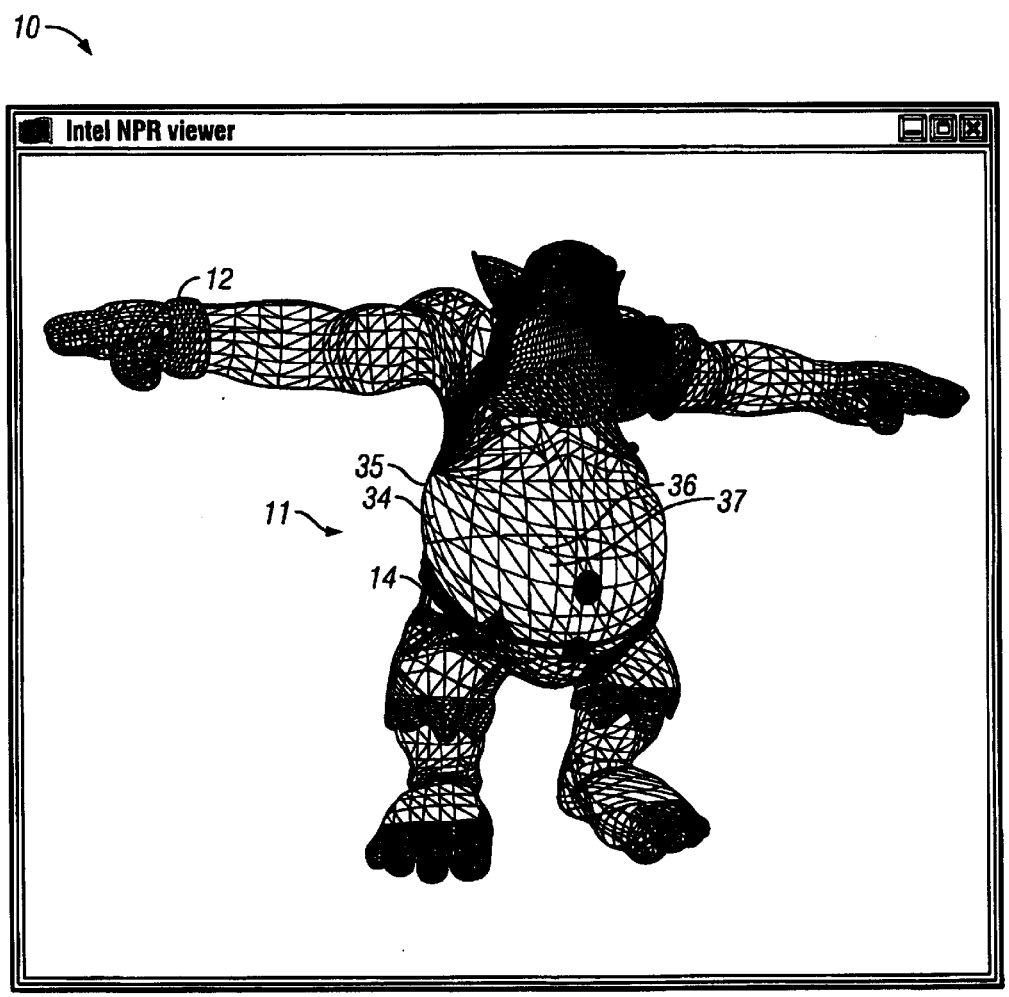
FIG. 2 is a view of a wireframe mesh showing polygons that make up the 3D model.
Figure 3:
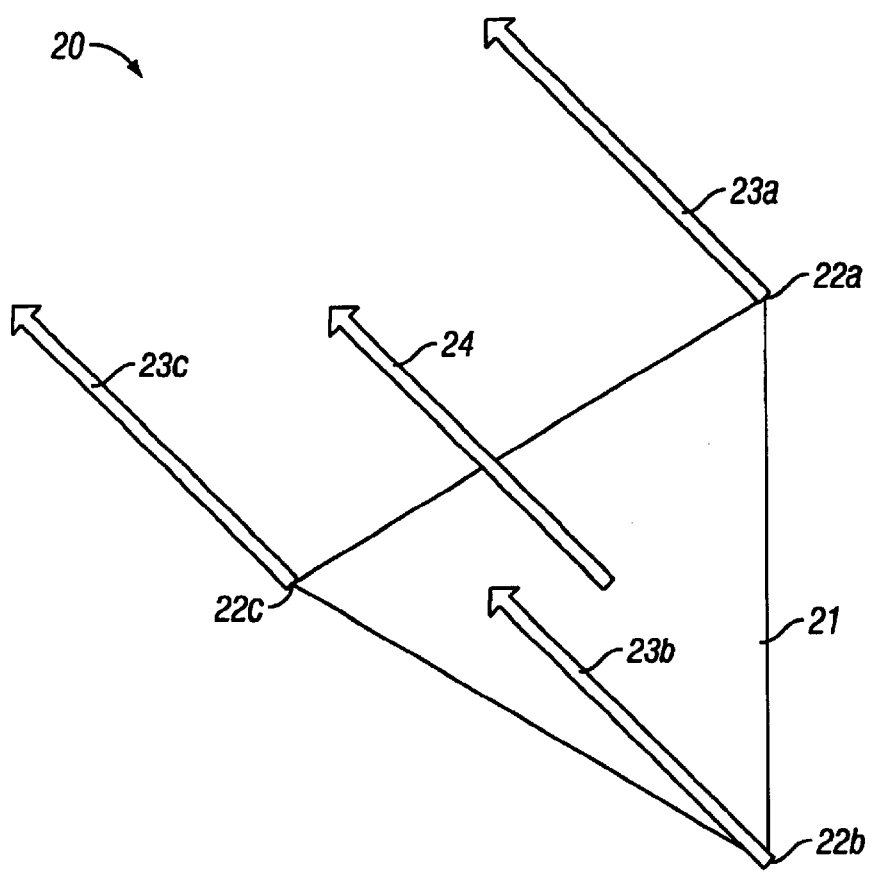
FIG. 3 is a view of one of the polygons.

As shown in FIGS. 1 and 2, 3D model 10 is comprised of interconnecting polygons 11. Polygons 11 are triangles in this embodiment; however, other types of polygons may be used. Groups of polygons are organized into meshes, each of which corresponds to an element of the 3D model. For example, arm band 12 and belt 14 are in different meshes.

The 3D data for each triangular polygon is comprised of three vertices positioned in (x,y,z) coordinate space. These vertices define a face for each polygon in the image. The 3D data also includes a normal vector to each face and vertex, which is also positioned in (x,y,z) coordinate space. For example, in FIG. 3, polygon 20 includes face 21, vertices 22a, 22b and 22c, vertex normals 23a, 23b and 23c, and face normal 24. This 3D data is used in process 25, shown in FIG. 4, to render 2D NPR images of 3D model 10.

Figure 5:
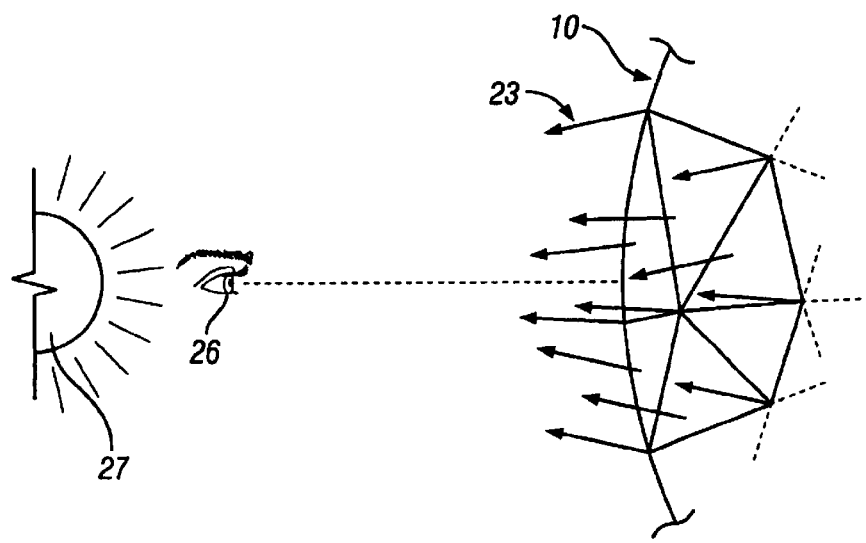
FIG. 5 is a view of vectors for the 3D model.

Process 25 begins in 402 by rendering a shaded image of 3D model 10. The shaded image is rendered by redirecting (402a) all normal vectors in 3D model 10 so that they point toward the same location. For example, in FIG. 5, normal vectors 23 may be redirected so that they all point towards a virtual eyepoint 26. The virtual eyepoint 26 is a predetermined location in the virtual world inhabited by 3D model 10, from which 3D model 10 is viewed. The light source 27 in this virtual world is coincident with virtual eyepoint 26.

Figure 6:
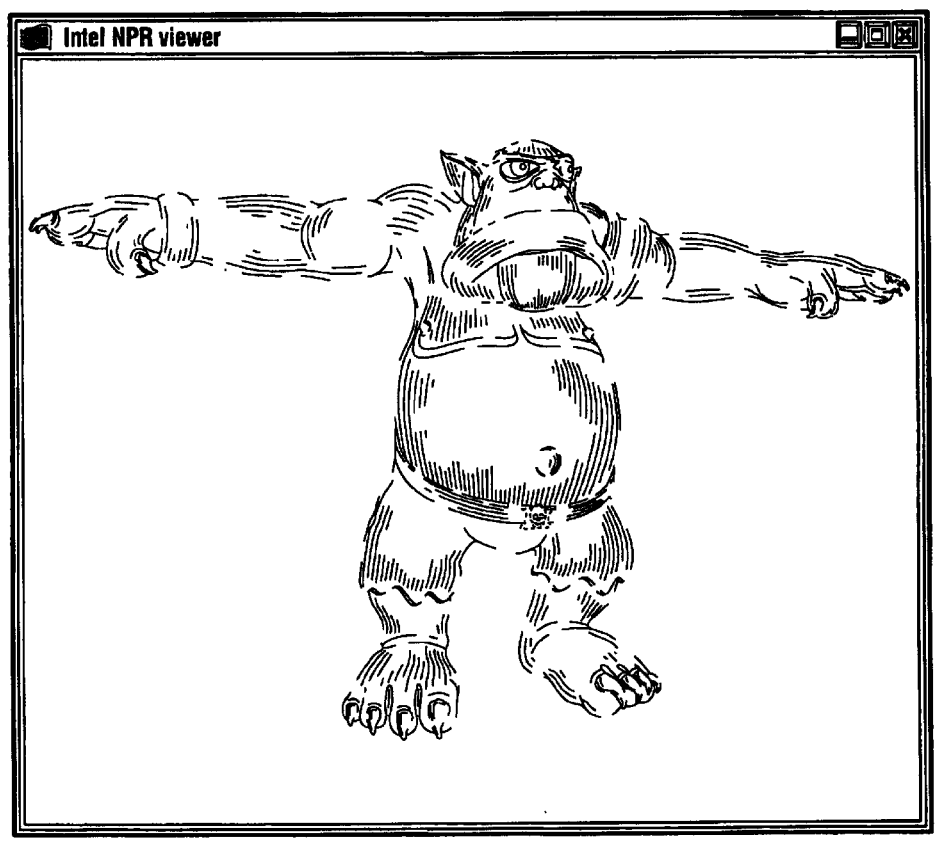
FIG. 6 is a view of a shaded image generated by the process of FIG. 4.

The shaded image is rendered in 402b based on 3D data for the 3D model (with its normal vectors pointing towards the virtual eyepoint). As shown in FIG. 6, the resulting shaded image 29 includes no outlines or silhouette edges (a silhouette edge refers to a boundary between front facing polygons and back facing polygons in 3D model 10). This is because the shading provided to an image during image rendering is, in part, a function of the directions of the normal vectors on the 3D model.

Figure 7:
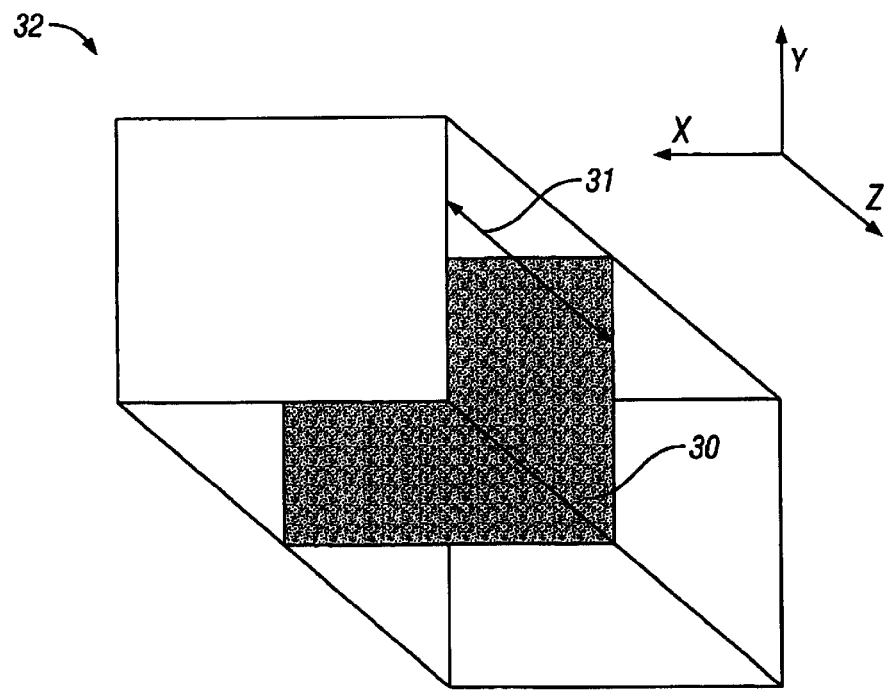
FIG. 7 is a view of a frame buffer and a z-buffer.

In 402b, the shaded image is rendered in a frame buffer (see below). The frame buffer is a 2D (x,y) memory that stores the image prior to display. A z-buffer contains data indicating the distance (the z dimension) between the virtual eyepoint and the shaded image. The frame buffer and z-buffer can be conceptualized as a 3D buffer (though that is not necessarily how the frame buffer and z-buffer are implemented). For example, in FIG. 7, shaded image 30 may be viewed as an x-y planar image (in the frame buffer) that is located at a predetermined "depth" 31 within z-buffer 32.

Returning to FIG. 4, process 25 renders (403) an outline image of 3D model 10 based on data for 3D model 10. The outline image is rendered with the shaded image in the frame buffer to obtain an NPR 2D image. In this context, an outline image can refer to any image of 3D model 10 that is formed from discrete lines (as opposed to shading). The following describes rendering a "wireframe" outline image (see FIG. 2) in 403; however, other types of outline images, such as silhouette edge images, may be also rendered.

The rendering process of 403 obtains (403a) parameters ("u" and "v"). As described below, these parameters relate to a desired aesthetic effect of the 2D image produced by process 25. These parameters may be obtained from any source. For example, they may be input by a user via a graphical user interface ("GUI"), read from a memory, or downloaded from a remote source, such as a network server.

In 403b, process 25 obtains a slope of a "target" polygon in 3D model 10. The outline image is rendered based on the slopes of polygons in the 3D model. "Slope" refers to the slope of a polygon relative to the perspective of the virtual eyepoint. A surface curving away from, or towards, the virtual eyepoint will have a larger slope than a surface which appears "flat" relative to the virtual eyepoint. Large changes in slope occur mostly at edges of the 3D model. For example, in FIG. 2, polygons 34 and 35 have greater slopes than polygons 36 and 37 (assuming that the virtual eyepoint in this case is 90° to the page).

The slope of a polygon is defined as the maximum of the incremental differences in z-buffer values for the polygon in both the x and y directions. This can be represented mathematically as follows:

$$slope = \max\left(\left|\frac{\partial z}{\partial x}\right|, \left|\frac{\partial z}{\partial y}\right|\right).$$

One way of determining values for $|\partial z/\partial x|$ and $|\partial z/\partial y|$ on a target polygon is to calculate differences in pixel locations in the z-x and z-y directions on the polygon.

In 403c, process 25 determines an offset value ("z_offset"). This offset value is used in determining which portions of the shaded image and which portions of the wireframe image will be included in the final 2D NPR image. When the wireframe image is rendered, values of z_offset are added to z-dimension values of the wireframe image. This causes portions of the wireframe image to move "in front of" the shaded image in the frame buffer. The resulting 2D NPR image in the frame buffer comprises those portions of the wireframe image and shaded image that are "in front", as defined by data in the z-buffer (see below). Accordingly, the final 2D image produced by process 25 will include portions of both the shaded image and the wireframe image.

The value of z_offset is determined based on the slope (from 403b), u and v (from 403a), and the resolution of the z-buffer. The resolution of the z-buffer (e.g., 640×480 pixels) is a characteristic of the hardware used to implement the frame buffer and may be stored, for example, in a memory on a computer executing process 25. The formula for determining z_offset is as follows:

$$z\_offset = (slope * u) + (z\_buffer\_resolution * v),$$

where "slope" is the slope of a target polygon, and "z_buffer_resolution" is the resolution of the z_buffer.

A large value of "u" in the above equation increases the importance of the slope in determining z_offset. The resulting effect of a large "u" value is to bring more "sloped" portions of the wireframe image closer to the foreground, leaving unsloped portions in the background. This produces a 2D NPR image with features (e.g., muscles) that are accentuated. The resulting effect of a large "v" value is to bring all portions of the wireframe image equally closer to the foreground regardless of their slopes.

Bringing a portion of the wireframe image "closer" to the foreground means moving that portion closer to the front of the shaded image as defined in the z-buffer. It does not necessarily mean bringing those portions in front of the shaded image, though it may. Whether portions of the wireframe image actually move in front of the shaded image depends on the value of z_offset and the original location of the wireframe image defined in the z-buffer.

In 403d, process 25 decides which portions of the outline image are to be included in the final 2D image. This is done by adding the value of z_offset to z-buffer values for the wireframe image in the z-buffer (called "$z\_buffer_{new}$") In rendering (403e) the 2D NPR image, process 25 compares the sum of $z\_buffer_{new}$ and z_offset to values for the shaded image in the z-buffer ("$z\_buffer_{old}$").

Figure 8:
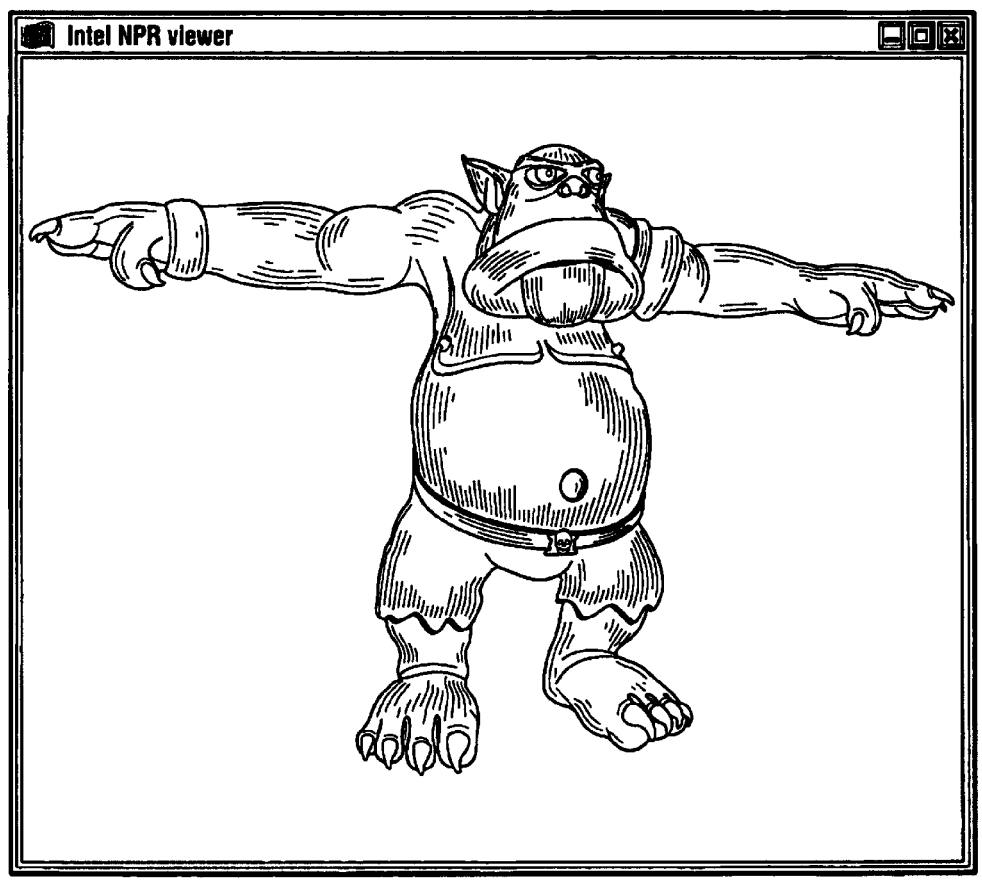
FIG. 8 is a view of a 2D NPR image generated by the process of FIG. 4.

If $z\_buffer_{old}$ is greater than the sum of $z\_buffer_{new}$ and z_offset in a predefined portion of the frame buffer, this means that data for the shaded image is in front of data for the wireframe image in that portion of the frame buffer. Thus, for the predefined area, the data for the shaded image is used to render the 2D image. If $z\_buffer_{old}$ is less than the sum of $z\_buffer_{new}$ and z_offset, this means that data for the wireframe image is in front of the data for the shaded image in that portion of the frame buffer. Thus, for the predefined area, the data for the wireframe image is used to render the 2D image. FIG. 8 shows an example of a 2D NPR image that was rendered by process 25.

Process 25 may also include an additional step (not shown) for selecting a pixel width of lines in the wireframe image. This can be done by a user via a GUI (not shown). Varying pixel width (and thus the thickness) of lines in the wireframe image increases the variety of images that can be rendered by process 25.

Process 25 may be used to create animation cels for cartooning. For example, a 3D model, such as model 10, may be generated and then rendered in one position. Process 25 may be executed on the model to produce an NPR 2D image for that position. Then, the 3D model 10 can be rendered in a new position (e.g., rotated), and process 25 executed on the re-positioned model to produce an NPR 2D image for the new position. This process may be repeated to produce NPR 2D images for any number of positions. In this way, process 25 can automatically generate animation cels that contain NPR 2D images without manually re-drawing the images.

Process 25 is performed using 3D data. By using 3D data, process 25 can be performed by a processor and rendering can be performed by graphics accelerator cards of a personal computer and a standard 3D graphics pipeline.

Figure 9:
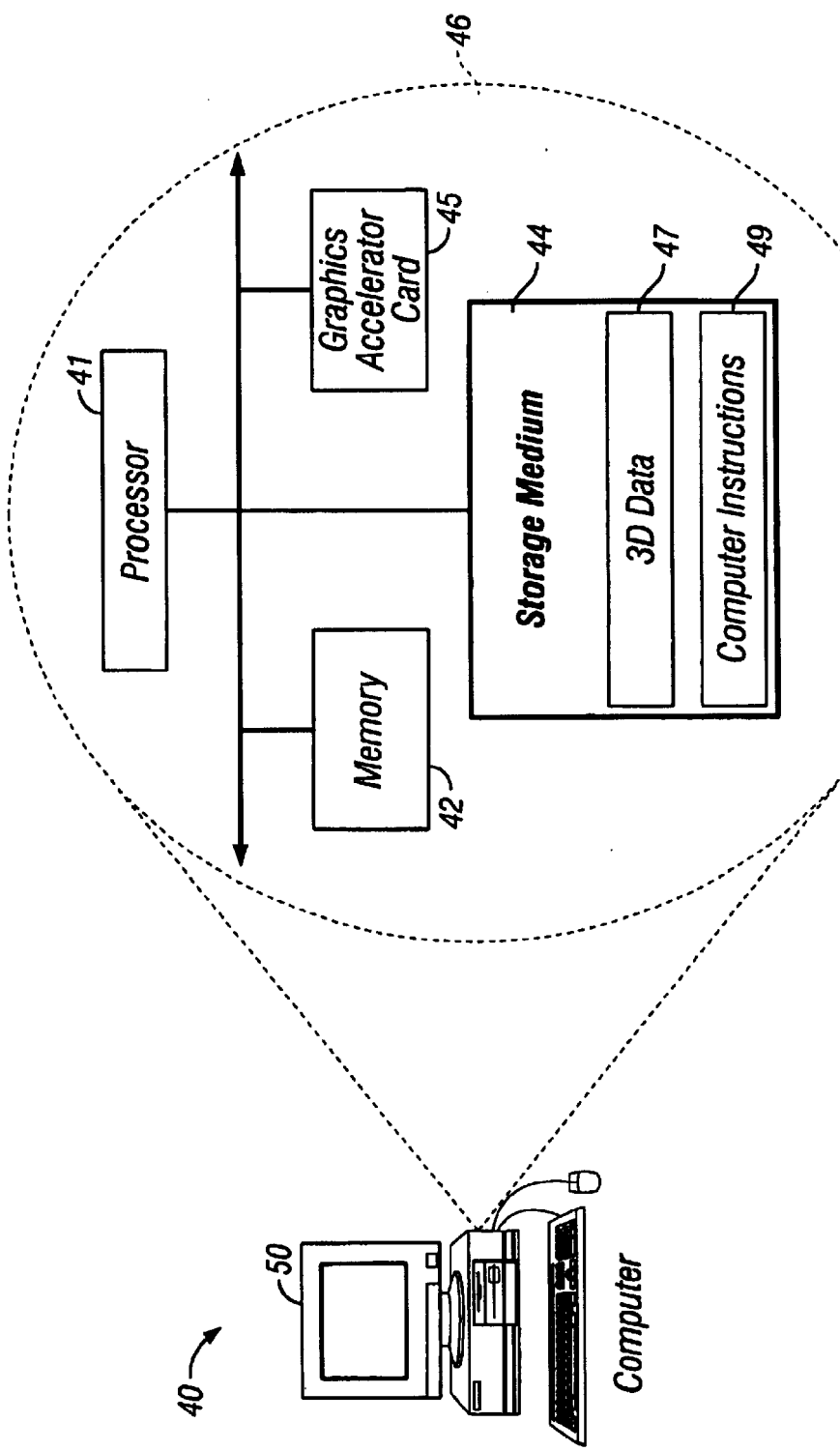
FIG. 9 is a view of computer hardware on which the process of FIG. 4 may be implemented.

FIG. 9 shows a computer 40 for rendering 2D NPR images using process 25. Computer 40 includes a processor 41, a memory 42, a storage medium 44 (e.g., a hard disk), and a 3D graphics accelerator card 45 for repositioning a 3D model and manipulating 3D data (see view 46). Storage medium 44 stores 3D data 47 for model 10, and computer-executable instructions 49 for rendering NPR 2D images via process 25.

Process 25, however, is not limited to use with any particular hardware or software configuration; it may find applicability in any computing or processing environment. Process 25 may be implemented in hardware, software, or a combination of the two. Process 25 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 25 and to generate output information. The output information may be applied to one or more output devices, such as display screen 50, for viewing by a user.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 25. Process 25 may also be implemented as a computer-readable storage medium, configured with a computer program, where, upon execution, instructions in the computer program cause the computer to operate in accordance with process 25.

Figure 4:
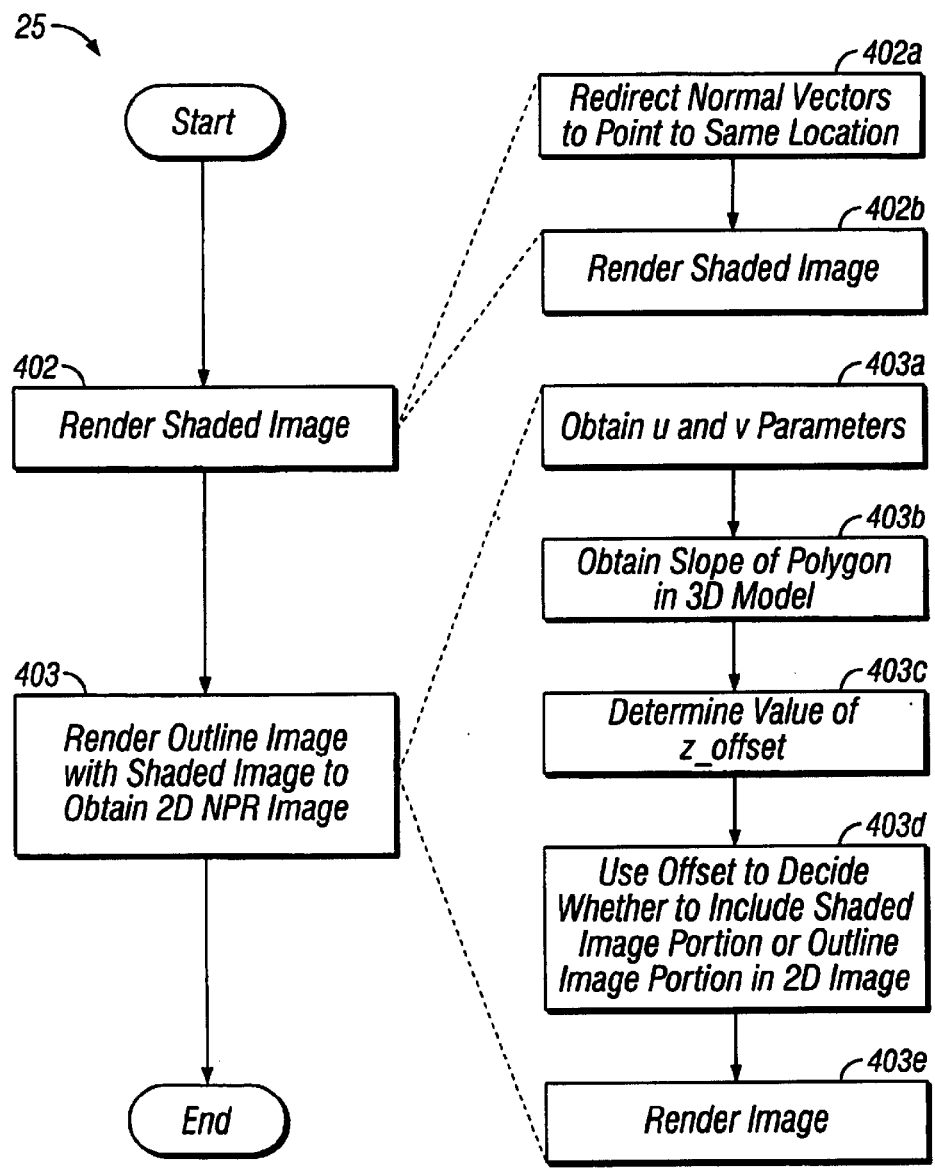
FIG. 4 is a flowchart showing a process for rendering a 2D image from data for the 3D model according to one embodiment of the invention.

Other embodiments not described herein are also within the scope of the following claims. For example, the "(z_buffer_resolution * v)" term may be omitted from the z_offset equation above, particularly if movement of the entire wireframe image relative to the shaded image is not desired. Rather than redirecting the normal vectors in 402a, process 25 may, alternatively, define a specific shade for each vertex of each polygon to produce the shaded image of FIG. 6. The order of processing shown in FIG. 4 can be modified. For example, the slope could be obtained (403b) before the u and v parameters (403a) and/or various steps could be executed concurrently or not at all. In this regard, the process order depicted in FIG. 4 is merely one way of implementing the invention; other ways of implementing the invention are also within the scope of the following claims.

What is claimed is:

1. A method of rendering a two-dimensional nonphotorealistic image from data for a three-dimensional model, comprising:

rendering a shaded image based on the data, the shaded image comprising a two-dimensional nonphotorealistic image having no outlines; and rendering an outline image based on the data, the outline image comprising a two-dimensional image and augmenting the shaded image to obtain the two-dimensional nonphotorealistic image, the outline image augmenting the shaded image by moving in front of the shaded image in a three-dimensional buffer relative to a virtual eyepoint;

wherein two parameters define how the outline image moves in front of the shaded image, the two parameters comprising a first parameter and a second parameter, the first parameter weighting a slope of a polygon associated with the outline image to move a portion of the outline image that corresponds to the polygon relative to the virtual eyepoint, and the second parameter weighting all portions of the outline image equally to move an entirety of the outline image relative to the virtual eyepoint.

2. The method of claim 1, wherein the outline image comprises a wireframe image of the three-dimensional model or a silhouette image of the three-dimensional model.

3. The method of claim 1, wherein rendering the shaded image comprises:

pointing normal vectors of the three-dimensional model towards a predetermined location; and rendering the shaded image based on the normal vectors.

4. The method of claim 1, wherein the polygon is part of the three-dimensional model.

5. The method of claim 1, wherein rendering the outline image comprises:

obtaining the slope of a polygon relative to a predetermined point;

determining an offset value based on the slope and the two parameters; and deciding whether a portion of the outline image or a portion of the shaded image is to be included in the two-dimensional nonphotorealistic image using the offset value.

6. The method of claim 5, wherein deciding is performed based on a comparison of a z-buffer value of data for the shaded image to a sum of the offset value and a z-buffer value of data for the outline image.

7. The method of claim 5, wherein the two parameters are user-supplied parameters.

8. The method of claim 7, wherein the offset value is determined based, in addition, on a resolution of a z-buffer employed in rendering the two-dimensional nonphotorealistic image.

9. A method of rendering a two-dimensional nonphotorealistic cartoon image from a three-dimensional model, comprising:

rendering the three-dimensional model in a predetermined position;

rendering a shaded two-dimensional image of the three-dimensional model in the predetermined position, the shaded two-dimensional image comprising a nonphotorealistic image having no outlines; and rendering a two-dimensional outline image of the three-dimensional model in the predetermined position, the two-dimensional outline image augmenting the shaded two-dimensional image to obtain the two-dimensional nonphotorealistic cartoon image, the two-dimensional outline image augmenting the shaded two-dimensional image by moving in front of the shaded two-dimensional image in a three-dimensional buffer relative to a virtual eyepoint;

wherein two parameters define how the two-dimensional outline image moves in front of the shaded two-dimensional image, the two parameters comprising a first parameter and a second parameter, the first parameter weighting a slope of a polygon associated with the two-dimensional outline image to move a portion of the two-dimensional outline image that corresponds to the polygon relative to the virtual eyepoint, and the second parameter weighting all portions of the two-dimensional outline image equally to move an entirety of the two-dimensional outline image relative to the virtual eyepoint.

10. The method of claim 9, further comprising:

rendering the three-dimensional model in a second position which is different from the predetermined position;

rendering a shaded two-dimensional nonphotorealistic image of the three-dimensional model in the second position; and rendering a two-dimensional outline image of the three-dimensional model in the second position, the outline image augmenting the shaded two-dimensional image to obtain a second two-dimensional nonphotorealistic cartoon image.

11. An article comprising a computer-readable medium which stores executable instructions for rendering a two-dimensional nonphotorealistic image from data for a three-dimensional model, the executable instructions causing a computer to:

render a shaded image based on the data, the shaded image comprising a two-dimensional nonphotorealistic image having no outlines; and render an outline image based on the data, the outline image comprising a two-dimensional image and augmenting the shaded image to obtain the two-dimensional nonphotorealistic image, the outline image augmenting the shaded image by moving in font of the shaded image in a three-dimensional buffer relative to a virtual eyepoint;

wherein two parameters define how the outline image moves in front of the shaded image, the two parameters comprising a first parameter and a second parameter, the first parameter weighting a slope of a polygon associated with the outline image to move a portion of the outline image that corresponds to the polygon relative to the virtual eyepoint, and the second parameter weighting all portions of the outline image equally to move an entirety of the outline image relative to the virtual eyepoint.

12. The article of claim 11, wherein the outline image comprises a wireframe image of the three-dimensional model or a silhouette image of the three-dimensional model.

13. The article of claim 11, wherein rendering the shaded image comprises:

pointing normal vectors of the three-dimensional model towards a predetermined location; and rendering the shaded image based on the normal vectors.

14. The article of claim 11, wherein the polygon is part of the three-dimensional model.

15. The article of claim 11, wherein rendering the outline image comprises:

obtaining a slope of the polygon relative to a predetermined point;

determining an offset value based on the slope and the two parameters; and deciding whether a portion of the outline image or a portion of the shaded image is to be included in the two-dimensional nonphotorealistic image using the offset value.

16. The article of claim 15, wherein deciding is performed based on a comparison of a z-buffer value of data for the shaded image to a sum of the offset value and a z-buffer value of data for the outline image.

17. The article of claim 15, wherein the two parameters are user-supplied.

18. The article of claim 17, wherein the offset value is determined based, in addition, on a resolution of a z-buffer employed in rendering the two-dimensional nonphotorealistic image.

19. An article comprising a computer-readable medium which stores executable instructions for rendering a two-dimensional nonphotorealistic cartoon image from a three-dimensional model, the executable instructions causing a computer to:

render the three-dimensional model in a predetermined position;

render a shaded two-dimensional image of the three-dimensional model in the predetermined position, the shaded two-dimensional image comprising a nonphotorealistic image having no outlines; and render a two-dimensional outline image of the three-dimensional model in the predetermined position, the two-dimensional outline image augmenting the shaded two-dimensional image to obtain the two-dimensional nonphotorealistic cartoon image, the two-dimensional outline image augmenting the shaded two-dimensional image by moving in front of the shaded two-dimensional image in a three-dimensional buffer relative to a virtual eyepoint;

wherein two parameters define how the two-dimensional outline image moves in front of the shaded two-dimensional image, the two parameters comprising a first parameter and a second parameter, the first parameter weighting a slope of a polygon associated with the two-dimensional outline image to move a portion of the two-dimensional outline image that corresponds to the polygon relative to the virtual eyepoint, and the second parameter weighting all portions of the two-dimensional outline image equally to move an entirety of the two-dimensional outline image relative to the virtual eyepoint.

20. The article of claim 19, wherein the executable instructions are usable by the computer to:

render the three-dimensional model in a second position which is different from the predetermined position;

render a shaded two-dimensional image of the three-dimensional model in the second position, the shaded two-dimensional image comprising a nonphotorealistic image having no outlines; and render a two-dimensional outline image of the three-dimensional model in the second position, the two-dimensional outline image augmenting the shaded two-dimensional image to obtain a second two-dimensional nonphotorealistic cartoon image.

21. An apparatus for rendering a two-dimensional nonphotorealistic image from data for a three-dimensional model, comprising:

a memory which stores executable instructions; and a processor which executes the instructions to (i) render a shaded image based on the data, the shaded image comprising a two-dimensional nonphotorealistic image having no outlines, and (ii) render an outline image based on the data, the outline image comprising a two-dimensional image and augmenting the shaded image to obtain the two-dimensional nonphotorealistic image, the outline image augmenting the shaded image by moving in front of the shaded image in a three-dimensional buffer relative to a virtual eyepoint;

wherein two parameters define how the outline image moves in front of the shaded image, the two parameters comprising a first parameter and a second parameter, the first parameter weighting a slope of a polygon associated with the outline image to move a portion of the outline image that corresponds to the polygon relative to the virtual eyepoint, and the second parameter weighting all portions of the outline image equally to move an entirety of the outline image relative to the virtual eyepoint.

22. The apparatus of claim 21, wherein the outline image comprises a wireframe image of the three-dimensional model or a silhouette image of the three-dimensional model.

23. The apparatus of claim 21, wherein rendering the shaded image comprises:

pointing normal vectors of the three-dimensional model towards a predetermined location; and rendering the shaded image based on the normal vectors.

24. The apparatus of claim 21, wherein the polygon is part of the three-dimensional model.

25. The apparatus of claim 21, wherein rendering the outline image comprises:

obtaining a slope of the a polygon relative to a predetermined point;

determining an offset value based on the slope and the two parameters; and deciding whether a portion of the outline image or a portion of the shaded image is to be included in the two-dimensional nonphotorealistic image using the offset value.

26. The apparatus of claim 25, wherein deciding is performed based on a comparison of a z-buffer value of data for the shaded image to a sum of the offset value and a z-buffer value of data for the outline image.

27. The apparatus of claim 25, wherein the two parameters are user-supplied.

28. The apparatus of claim 27, wherein the offset value is determined based, in addition, on a resolution of a z-buffer employed in rendering the two-dimensional nonphotorealistic image.

29. An apparatus for rendering a two-dimensional nonphotorealistic cartoon image from a three-dimensional model, comprising:

a memory which stores executable instructions; and a processor which executes the instructions to (i) render the three-dimensional model in a predetermined position, (ii) render a shaded two-dimensional image of the three-dimensional model in the predetermined position, the shaded two-dimensional image comprising a nonphotorealistic image having no outlines, and (iii) render a two-dimensional outline image of the three-dimensional model in the predetermined position, the two-dimensional outline image augmenting the shaded two-dimensional image to obtain the two-dimensional nonphotorealistic cartoon image, the two-dimensional outline image augmenting the shaded two-dimensional image by moving in front of the shaded two-dimensional image in a three-dimensional buffer relative to a virtual eyepoint;

wherein two parameters define how the two-dimensional outline image moves in front of the shaded two-dimensional image, the two parameters comprising a first parameter and a second parameter, the first parameter weighting a slope of a polygon associated with the two-dimensional outline image to move a portion of the two-dimensional outline image that corresponds to the polygon relative to the virtual eyepoint, and the second parameter weighting all portions of the two-dimensional outline image equally to move an entirety of the two-dimensional outline image relative to the virtual eyepoint.

30. The apparatus of claim 29, wherein the processor also executes instructions to (i) render the three-dimensional model in a second position which is different from the predetermined position, (ii) render a shaded two-dimensional image of the three-dimensional model in the second position, the shaded two-dimensional image comprising a nonphotorealistic image having no outlines, and (iii) render a two-dimensional outline image of the three-dimensional model in the second position, the outline image augmenting the shaded two-dimensional image to obtain a second two-dimensional nonphotorealistic cartoon image.

* * * * *